Dec. 13, 1932.     J. E. SCOTT     1,890,623
HAND BRAKE RIGGING
Filed June 23, 1930     2 Sheets-Sheet 1
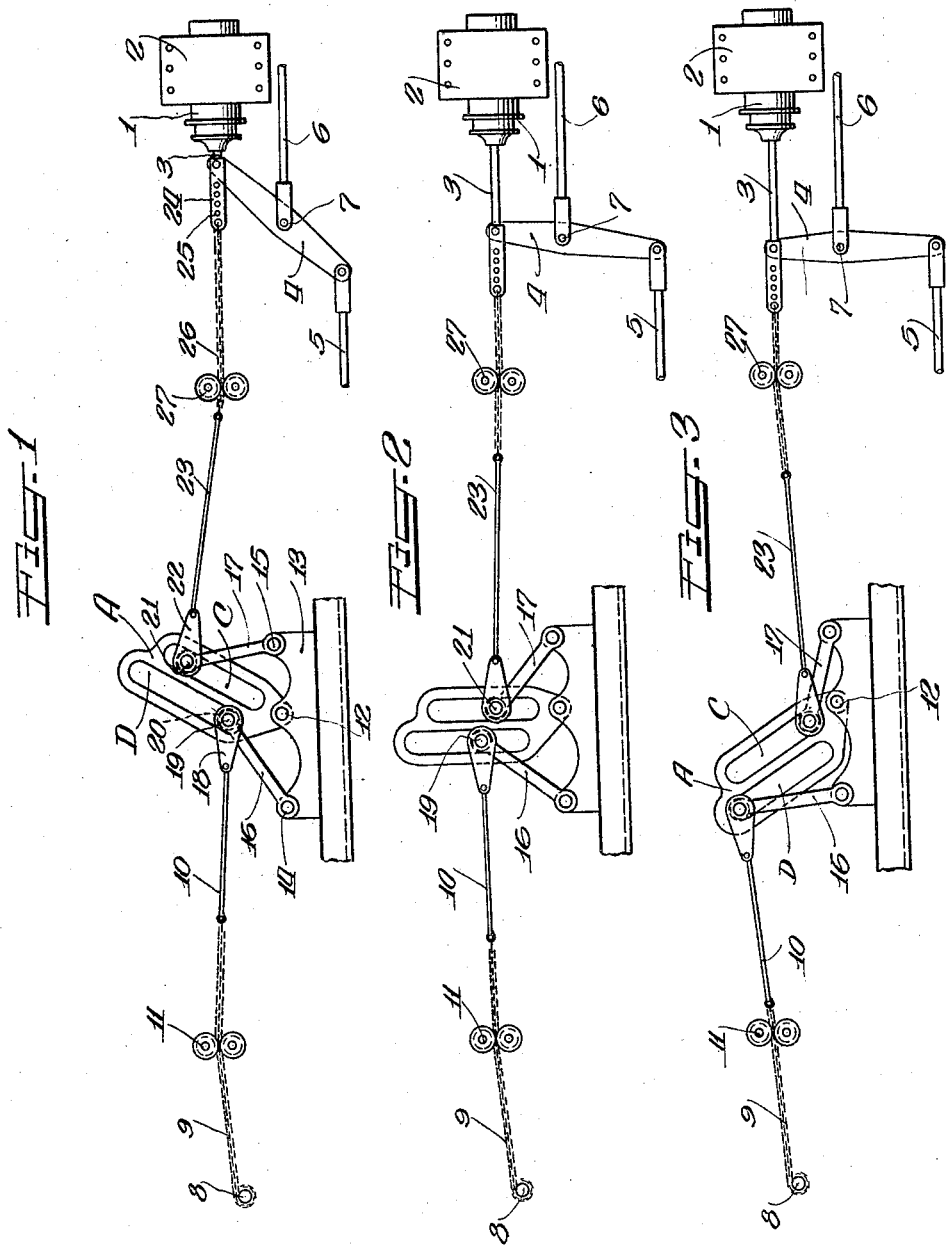
Inventor:
John E. Scott.
by: Charles Stilla Attys.

Dec. 13, 1932.   J. E. SCOTT   1,890,623
HAND BRAKE RIGGING
Filed June 23, 1930   2 Sheets-Sheet 2
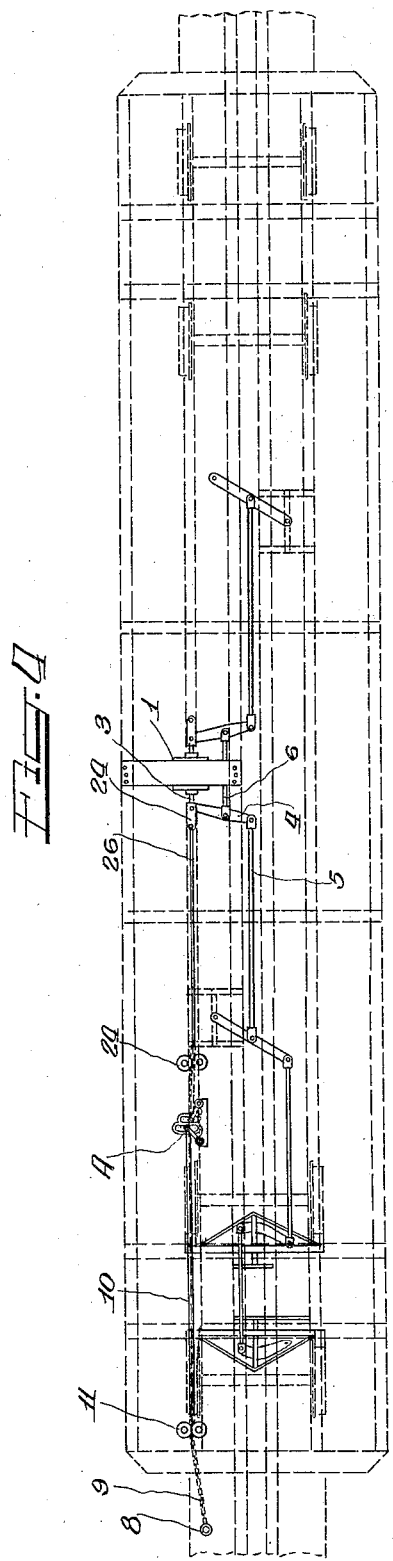
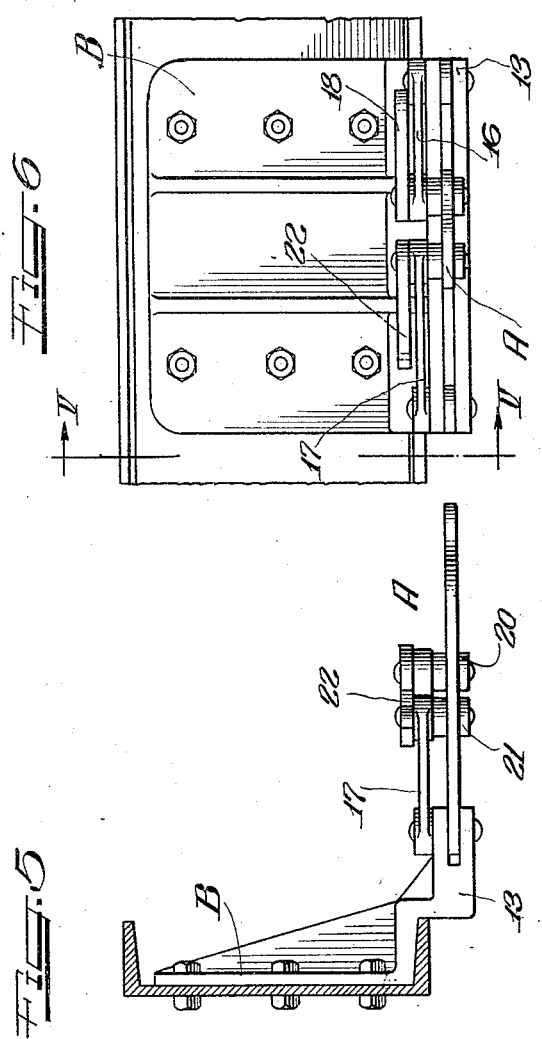
Inventor:
John E. Scott.
by: Charles Miller Attys.

Patented Dec. 13, 1932

1,890,623

UNITED STATES PATENT OFFICE

JOHN E. SCOTT, OF DANVILLE, ILLINOIS, ASSIGNOR TO ALLITH-PROUTY COMPANY, OF DANVILLE, ILLINOIS, A CORPORATION OF DELAWARE

HAND BRAKE RIGGING

Application filed June 23, 1930. Serial No. 462,963.

This invention relates to hand brake rigging and particularly to rigging for cooperation with brake levers of air brake mechanisms whereby the hand brakes may quickly apply the car brakes on slight operation of a hand brake staff, and whereby increased leverage on the brake levers is attained as the rotation of the staff is continued.

An object of the present invention is to provide hand brake rigging which is simple in construction and highly efficient in use.

Another object of the invention is to provide hand brake rigging wherein slack is quickly taken up and the brakes applied with minimum effort on the part of a brakeman.

A further object of this invention is to provide hand brake rigging wherein increased braking effect is attained with easy operation of the hand brake.

A still further object of the invention is to provide hand brake rigging connected to brake levers through means for effecting rectilinear movements of the connecting parts in differential relation.

The above, other, and further objects of the invention will be apparent from the following description, accompanying drawings, and appended claims.

Generally speaking, the invention contemplates the provision of a swinging arm which has two slots therein, a member movable along one slot and connected to the hand brake staff, another member movable along the other slot and connected to the brake lever system, the members moving in opposite directions as the arm is swung whereby pull exerted by the hand brake staff is transmitted to the brake levers with increasing power effect.

An embodiment of the invention is illustrated in the accompanying drawings and the views thereof are as follows:

Figure 1 is a diagrammatic representation of a simple brake arrangement embodying the present invention showing the parts with the brakes in off position.

Figure 2 illustrates the arrangement and association of parts when brakes are partly applied.

Figure 3 shows the relation of the parts when the hand brake rod has been tightened to its maximum extent and the full effect of the pull thereon on the brakes is at maximum.

Figure 4 is a schematic plan view of the underside of a car equipped with a simple brake rigging embodying the present invention.

Figure 5 is a section taken substantially in the plane of line V—V of Figure 6.

Figure 6 is a front elevational view of the oscillating arm forming a part of the present invention.

The drawings will now be explained.

An air brake cylinder 1 is secured by means of a fastening plate 2 to any suitable portion of the car underframe. The brake push rod 3 is connected to one end of a brake lever 4, while the other end of the brake lever is connected to a pull rod 5. A cylinder rod 6 is pivoted at 7 to the lever 4 intermediate its ends.

A hand brake staff or actuator 8 is arranged in the car in the usual manner for well-known purposes. A chain 9 is connected to the staff to be wound about the same when the staff is rotated in a direction to set the brakes. A hand brake rod 10 is connected to the chain 9.

Rollers 11 are provided for guiding the chain 9 and the hand brake rod 10 and the to and fro movement thereof in service.

It is desirable that the hand brake staff be so connected to the brake lever as to quickly take up slack and apply the brakes with minimum effort on the part of a brakeman and without having to rotate the brake staff any considerable extent.

The present invention utilizes a swinging or oscillating arm associated with the hand brake rod and a rod which, for convenience herein, will be referred to as the air cylinder brake rod for actuation of the brake levers.

A swinging or oscillating arm A is pivoted at 12 to a casting B which is fastened to any convenient portion of the underframe of the car. The accompanying drawings illustrate the arm A as swingable in a horizontal plane about a vertical axis. The arm might as well swing in a vertical plane about a horizontal axis, if desired, without in any manner affecting its efficiency in brake operation.

The casting B has a ledge 13 which supports the pivot 12 of the arm A.

The arm A is provided with two slots C and D which are parallel and, as illustrated, one of the slots, shown as the slot C, is longer than the slot D and offset lengthwise with respect to the slot D. The axis of the slot C includes the pivot 12 of the arm A while the axis of the slot D is laterally disposed with respect to the axis of the slot C.

The ledge 13 has pivoted to it at 14 and 15 links 16 and 17 respectively. The pivots 14 and 15 lie on each side of the pivot 12 of the swinging arm A.

The hand brake rod 10 is connected to a clevis or similar attaching means 18 which in turn is fastened to a pin 19 extending through the slot D of the arm A, which pin 19 has a roller 20 or other anti-friction surface about the same. The roller 20 and pin 19 are carried also in the outer end of the link 16 so that, as the arm A is rocked in a manner to be hereinafter described, the link 16 will guide the pin 19 in its slot, thus imparting sidewise movement thereto, while the arm A pivots or oscillates to move the pin 19 through an arcuate path, as will be evident.

The link 17 carries at its end a pin 21 passing through the outer end of the link 17 and cooperating with its lever 22 which is fastened to the air cylinder brake rod 23. The pin 21 will move in like manner as pin 19, but as the paths are arranged, the pins 19 and 20 will move in opposite directions as the arm A is oscillated.

The air cylinder brake rod 23 is connected to a clevis 24 associated with the brake lever 4 which clevis is provided with a plurality of holes 25 whereby the links of the air cylinder brake rod 23 may be adjusted. The rod 23 is shown as connected by means of a chain 26 to the clevis 24; however, this is merely for convenience in making the drawings, and is not to be construed as constituting an essential part of the invention.

Rollers 27 are provided, between which the air cylinder brake rod 23 and its connected chain 26 may pass to and fro as moved in service.

The links 16 and 17 are so arranged that the pins 19 and 21 move in opposite directions in the slots C and D of the arm A as the same oscillates or is moved in either direction. This movement of the links controls the inward and outward movement of the hand brake rod 10 and the air cylinder brake rod 23.

The placing of the pin 19 ahead of the pivot 12 of the arm A causes the slightest pull imposed on the rod pin to swing the arm A to the left as shown in Figures 1, 2, and 3 of the drawings. This movement also is imparted to the pin 21, the link 17 and the air cylinder brake rod 23.

The position of the part shown in Figure 1 is with the brake fully released.

The staff 8 is rotated by a brakeman, and as soon as any rotative movement is imparted to this staff, the hand brake rod 10 is pulled to the left as observed in Figures 1, 2, and 3, whereupon the arm A is rocked to the left. The rocking movement of the arm A coacting with the roller 20 necessarily swings the link 16 to the left with consequent pull on the air cylinder brake rod 23.

The angular movement of the link 16 from the position of Figure 1 to the position of Figure 2 is slight. Furthermore, the amplitude of rectilinear movement of the pin 19 from the position of Figure 1 to the position of Figure 2 is slight compared to the amplitude of complete movement, that is, from the position of Figure 1 to the position of Figure 3.

The arm A in moving from the position of Figure 1 to the position of Figure 2 swings the link 17 through a much larger angle than the link 16 with the result that the amplitude of rectilinear movement of the air cylinder brake rod 23 is considerably greater than that of movement of the hand brake 10. Such movement, on initiation, takes up any slack that there may be and applies the brakes with a relatively short angle of rotation of the staff 8 and with the application of but light power to the staff. The air cylinder brake rod 23 in moving from the position in Figure 1 to the position in Figure 2 has moved through the greater part of the total amplitude of rectilinear movement of the same. It will be observed that the angular travel of the pin 21 in moving from the position of Figure 1 to the position of Figure 2 is greater than the angle of the pin 19 of the link 16 because of the angle of these links with respect to the rocker arm A, and also because of the lateral offset position of the slot D with respect to the pivot 12 of the arm. Continued rotation of the staff 8 swings the link 16 to the left until it reaches its limit of travel in that direction which is that shown in Figure 3. The link having reached its limit of travel in the braking direction is at the opposite end of the slot D of the arm A from which it started.

The amplitude of the rectilinear movement of the brake rod 10 from the position of Figure 2 to the position of Figure 3 is greater than that from the position of Figure 1 to the position of Figure 2; consequently, continued rotation of the staff 8, after the parts have reached the position of Figure 2, increases the braking effect without requiring considerable exertion of power at the staff 8.

Swinging of the arm A from the position of Figure 2 to the position of Figure 3 causes movement of the pin 21 to the lower end of the slot C so that the angular movement of the link 17 from the position of Figure 2 to the position of Figure 3 is rather slight; likewise, the amplitude of the rectilinear movement of the air cylinder brake rod 23 is slight.

The position of the parts as shown in Figure 3 illustrates the same when the hand brake rod 10 has been pulled to its limit of travel in brake setting direction.

The push rod 3 which is connected to the brake lever 4 naturally is withdrawn from the air cylinder 1 as the hand brake is set in the manner heretofore described. As soon as pressure is released on the staff, the push rod 3 will act to withdraw the same into the cylinder A and return the parts to the position of Figure 1. It may be noted that with the parts as shown in Figure 3, and with the push rod 3 effective to return the parts to normal position, the pulling link, which is now 17, is in the lower end of its slot and the pulled link, which is 16, is at the upper end of its slot or near the upper end, so that the angular movement of the pulling links at the initiation of swinging movement of the arm A is slight compared to the angular movement of the links connected to the pulled rod which, in the present instance, is the hand brake rod 10.

The provision of either of the pins 19 and/or 21 in its slot, to initiate swinging of the arm A in either direction, i. e., to the left under the staff and to the right under the pull of the lever to cylinder brake rod 23— is near the inner end, that is, the end nearer the arm pivot 12, so that the application of a relatively slight force is sufficient to rock the arm A.

The invention has been illustrated in connection with a simple brake rigging, but, of course, it may be readily utilized in connection with a compound brake rigging as well, as the swinging arm A and its associated parts are interposed between the brake staff and the air cylinder connections, and will operate as many brake levers as there are in the brake rigging equally as well.

It is believed that the projected travel of the hinges 19 and 21 of the links 16 and 17 will be readily apparent from Figures 1, 2, and 3 of the drawings. The link 16 swings to a greater angle than does the link 17; consequently, the projected line of the travel of the pin 19 will be greater than that of the pin 21. This results in the application of great power to the brake lever 4 with a relatively small rotation of the brake staff 8, so that the brake may be applied with equal and even with greater force than applied by the air cylinder 1 when the brake staff is actuated.

The invention has been described herein more or less precisely as to details, yet it is to be understood that the invention is not to be limited thereby as changes may be made in the arrangement and proportion of parts and equivalents may be substituted without departing from the spirit and scope of the invention.

The invention is claimed as follows:

1. A railway brake operating mechanism including a brake lever, a hand brake staff, a rocker, connections between said staff and said rocker, connections between said lever and said rocker, each of said connections having slidable engagement with said rocker, and members associated with said connections for causing arcuate movement of the ends of said connections in opposite directions along said rocker as said rocker oscillates.

2. A railway brake operating mechanism including in combination, a brake lever, a hand brake staff, a rocker plate having two parallel slots therein, a pin slidable in one slot connected to the brake lever, another pin slidable in the other slot and connected to the hand brake staff, a link pivotally connected to said first pin, another link pivotally connected to said second pin, the other ends of said links being pivotally connected in spaced relation to a fixed support on opposite sides of the rocker plate, said links serving to direct said pins in arcuate paths of travel as said plate oscillates, said pins moving in opposite directions along said slots during such rocking movement, the parts being so arranged that oscillation of said plate in one direction by actuation of the hand brake staff exerts a pull of increasing effect on said brake lever.

3. A car brake operating mechanism including a brake lever, a hand brake staff, a swing link, connections between said staff and said link, another swing link, connections between said brake lever and said other link, a double slotted member engaging both of the links for causing swinging movement thereof in the same direction therewith, whereby pull exerted by one link is transmitted through said member to said other link for movement in the same direction with different power effects.

4. A railway car brake operating mechanism including, a brake lever, a hand brake staff, a swinging arm, a plurality of means carried by said arm and slidable with respect thereto and also movable with respect to each other in opposite directions, said means having arcuate movement as said arm pivots with the rectilinear component of one different from the rectilinear component of the other, one of said means being connected to said staff and the other of said means being connected to the brake lever.

5. A mechanical movement including two links, each pivoted at one end, a swinging plate having two spaced parallel slots therein which are lengthwise offset, one of said links having its other end guided in one of said slots and the other of said links having its other end guided in the other of said slots, whereby when the plate is swung the other ends of said links move in the same angular direction with the projected linear distance of one different from the projected linear distance of the other.

6. A railway brake operating mechanism including a hand brake staff and a brake lever, a translating device for substantially rectilinear pull between said staff and said brake lever providing greater effort at one end than is applied at the pulling end, said device including two links each pivoted at similar ends with the other ends free to swing about the pivots, a plate pivoted intermediate the link pivots, said plate having two parallel slots therein which are lengthwise offset, the free end of one link being guided in one of said slots and the free end of the other link guided in the other of said slots, and one of said links being connected to the brake staff and the other of said links being connected to the brake lever.

7. A brake mechanism, including in combination with braking members, an actuator, a swinging link having two slots therein, connections between said actuator and said link with a portion thereof movable in one of said slots, and connections between said braking members and said link with a portion thereof movable in the other of said slots.

8. A brake mechanism, including in combination with braking members, an actuator, a swinging link having two slots therein, connections between said actuator and said link with a portion thereof movable in one of said slots, and connections between said braking members and said link with a portion thereof movable in the other of said slots, and means cooperatively associated with the portions of said connections which are movable in said slots for causing movement of said portions in opposite directions as said link is swung.

9. A booster of the type described, for a brake linkage system comprising a pivotally mounted block having opposed spaced vertical arms, a brake operating rod provided with means riding on one of the arms of the block, and a brake lever rod provided with means riding upon the other arm of the block whereby the operation of the brake lever in one direction will move the block on its pivot and cause said brake lever rod to climb its arm, and cause the brake operating rod to move downwardly on its arm to increase the leverage.

In testimony whereof I have hereunto subscribed my name at Danville, Vermilion County, Illinois.

JOHN E. SCOTT.